US008443072B1

(12) United States Patent
Orbach

(10) Patent No.: US 8,443,072 B1
(45) Date of Patent: May 14, 2013

(54) METHOD AND APPARATUS FOR MANAGING NETWORK CONGESTION DUE TO AUTOMATIC CONFIGURATION PROCEDURES

(75) Inventor: Julian J. Orbach, Macquarie Park (AU)

(73) Assignee: Avaya Inc., Basking Ridge, NJ (US)

( * ) Notice: Subject to any disclaimer, the term of this patent is extended or adjusted under 35 U.S.C. 154(b) by 2290 days.

(21) Appl. No.: 10/897,212

(22) Filed: Jul. 21, 2004

(51) Int. Cl.
*G06F 15/16* (2006.01)
*G06F 15/173* (2006.01)

(52) U.S. Cl.
USPC ............ 709/224; 709/223; 709/227; 709/228

(58) Field of Classification Search .................. 709/222, 709/232, 233, 235; 370/230, 232, 237, 395.43, 370/395, 43; 713/2
See application file for complete search history.

(56) References Cited

U.S. PATENT DOCUMENTS

| | | | | |
|---|---|---|---|---|
| 5,457,687 A | * | 10/1995 | Newman | 370/232 |
| 5,835,484 A | * | 11/1998 | Yamato et al. | 370/230 |
| 5,968,128 A | * | 10/1999 | Lauck et al. | 709/232 |
| 6,212,164 B1 | * | 4/2001 | Murakami et al. | 370/230 |
| 6,445,707 B1 | * | 9/2002 | Iuoras et al. | 370/395.43 |
| 6,671,257 B1 | * | 12/2003 | Soumiya et al. | 709/235 |
| 6,775,234 B1 | * | 8/2004 | Garcia-Martin | 370/237 |
| 6,882,624 B1 | * | 4/2005 | Ma | 709/233 |
| 2002/0161870 A1 | * | 10/2002 | French et al. | 709/222 |
| 2002/0161995 A1 | * | 10/2002 | French et al. | 713/2 |
| 2005/0226150 A1 | * | 10/2005 | Santos et al. | 370/230 |

* cited by examiner

*Primary Examiner* — Quang N Nguyen
(74) *Attorney, Agent, or Firm* — Sheridan Ross P.C.

(57) ABSTRACT

The present invention is directed to providing improved device boot times on a network while that network is congested. According to embodiments of the present invention, when a device initializes, it listens for a congestion alert message before making a request for configuration information. If a congestion alert message is not received, a request for configuration information may be sent without further delay. Alternatively, if a network congestion message is received, the device may implement an alternate connection request sequence, in which transmission of a request for configuration information is delayed. The period of delay may be predetermined, random, or a period of time recommended as part of the congestion alert signal.

30 Claims, 4 Drawing Sheets

METHOD AND APPARATUS FOR MANAGING NETWORK CONGESTION DUE TO AUTOMATIC CONFIGURATION PROCEDURES

FIELD OF THE INVENTION

The present invention is directed to managing network congestion. In particular, embodiments of the present invention provide a congestion alert signal, in response to which devices may alter their initialization procedures upon startup or rebooting.

BACKGROUND OF THE INVENTION

Devices operating in connection with a packet data communication network require certain configuration information. In order to facilitate the deployment of networks, such configuration information can be provided automatically, for example in connection with a dynamic host configuration protocol (DHCP) or a bootstrap protocol (BOOTP). Such configuration information may include the address of the device, the address of the local network server, the address of the gateway to the outside world, etc. In a typical implementation, a device sends a message on a well-known server port requesting such information when the device is initially started, or when it is rebooted.

In general, the amount of time required for a device to boot up should be kept short. In a typical case, the amount of time required for a network server and a device to perform the initial negotiation of assigned addresses and other information is a fraction of a second. However, the amount of time required for negotiation of such parameters can become significantly longer when the communication network is congested. One reason for increased negotiation times when the network is congested is that protocols for providing configuration information to devices are optimized for the typical case, in which a single device is booting, and when there is little congestion on the network. However, when a large number of devices boot up at the same time, for example after an interruption of power affecting the network, the network can become congested with requests for configuration information. In addition, devices requesting configuration information have no knowledge of current network conditions when they attempt to negotiate configuration information. Therefore, devices will request configuration information even though the request is likely to go unanswered, and even though the effect of the request is to increase network congestion. According to DHCP and other configuration protocols, when congestion is encountered, devices can have extended retry intervals. For example, retry intervals can be over a minute. Also, the size of the "randomness" window within which devices make their attempts to negotiate configuration information is small. As a result, the mean time to boot of devices can be drastically increased when congestion is encountered.

In order to provide improved boot times in situations where large numbers of devices are attempting to negotiate configuration information on a network, random delays can be applied. In particular, the time between starting a device and the initiation of the start algorithm can be randomly delayed. Although such an approach can be effective at reducing the average time to boot when a large number of devices are started or restarted at the same time, an unacceptable amount of delay is added to the time required for a device to boot under normal network conditions. Therefore, the use of random delays is not an acceptable solution to the problem of increased boot times in congested networks.

Another approach to providing improved boot times is to divide the communication network into a number of subnetworks. However, such "over-provisioning" of a network by providing a number of subnetworks and a corresponding number of servers is expensive, and results in a surplus of network capacity under normal operating conditions.

SUMMARY OF THE INVENTION

The present invention is directed to solving these and other problems and disadvantages of the prior art. In accordance with embodiments of the present invention, a network monitor application provides a broadcast congestion alert signal or message when congestion is detected. When devices boot up, they initially listen for the congestion alert message on a well-known port. If the congestion alert message is not detected, they may immediately commence initialization procedures. Alternatively, if a congestion alert message is detected, they can follow an alternate configuration procedure.

In accordance with embodiments of the present invention, the alternate configuration procedure followed in response to detecting a congestion alert message includes delaying the time until a request for configuration information is sent, rather than sending such a message immediately. The period of delay is, in accordance with embodiments of the present invention, random. In accordance with other embodiments of the present invention, the congestion alert message may include a suggested period of delay. In addition, individual devices may randomly alter the period of delay, whether such period is predetermined or suggested by a network authority.

In accordance with embodiments of the present invention, a network monitor application for providing broadcast alerts of network congestion may be implemented as part of a network server. In accordance with other embodiments of the present invention, the network monitor application may be implemented on a separate device interconnected to the communication network, such as a network monitor device.

Additional features and advantages of the present invention will become more readily apparent from the following description, particularly when taken together with the accompanying drawings.

DETAILED DESCRIPTION

Figure 1:
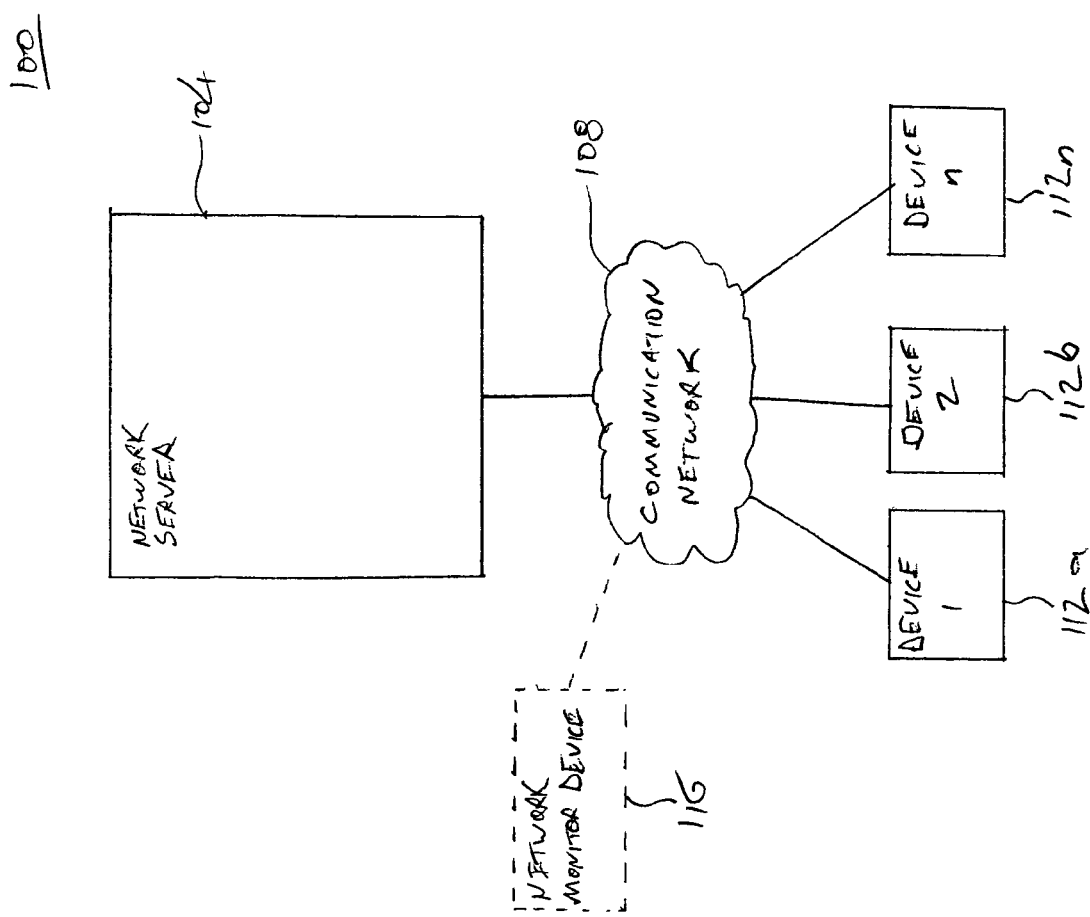
FIG. 1 is a block diagram depicting a system in accordance with embodiments of the present invention.

With reference now to FIG. 1, components of a system 100 in accordance with embodiments of the present invention are illustrated. In general, the system 100 includes a network server 104, a communication network 108, and a plurality of devices 112. In addition, embodiments of the present invention may include a network monitor device 116.

The network server 104 may comprise one or more computers or other devices operating as one or more servers with respect to the communication network 108. As an example, a network server 104 may comprise a communication server that is operable to provide a voice over Internet protocol (VoIP) communication system in cooperation with the communication network 108 and interconnected devices 112. In general, the network server 104 provides configuration information in response to requests received from devices 112. Such configuration information may include the address assigned to the requesting device 112, the assigned name of the device 112, the address of a gateway to a network interconnected to the communication network 108, for example the gateway to the Internet or other wide area network, or other information required by or useful to a device 112 in order to function appropriately with respect to the communication system 100. In accordance with embodiments of the present invention, the network server 104 may provide such configuration information in connection with a dynamic host configuration protocol (DHCP) or a bootstrap protocol (BOOTP). Accordingly, the network server 104 functions to provide configuration information to devices 112 automatically.

The communication network 108 may generally comprise an Internet protocol or other packet data network. Accordingly, a network server or servers 104, devices 112, and any network monitor device 116 associated with a communication network 108 may each have an assigned address. Particular examples of communication networks 108 include a wireless and/or wireline Ethernet network.

In general, a device 112 may comprise a general purpose computer or a packet data communication device. For example, a device 112 may comprise an Internet protocol (IP) telephone. As another example, a device 112 may comprise a general purpose computer implementing an IP telephone. As still other examples, a device 112 may comprise a router, gateway, or a data or communication endpoint. Although three devices 112a, 112b and 112n are illustrated in FIG. 1, it should be appreciated that any number of devices 112 maybe included in the system 100.

The communication system 100 may optionally include a network monitor device 116. The network monitor device 116 may provide a platform for a network monitor application, for example where such an application is not implemented as part of a network server 104.

Figure 2:
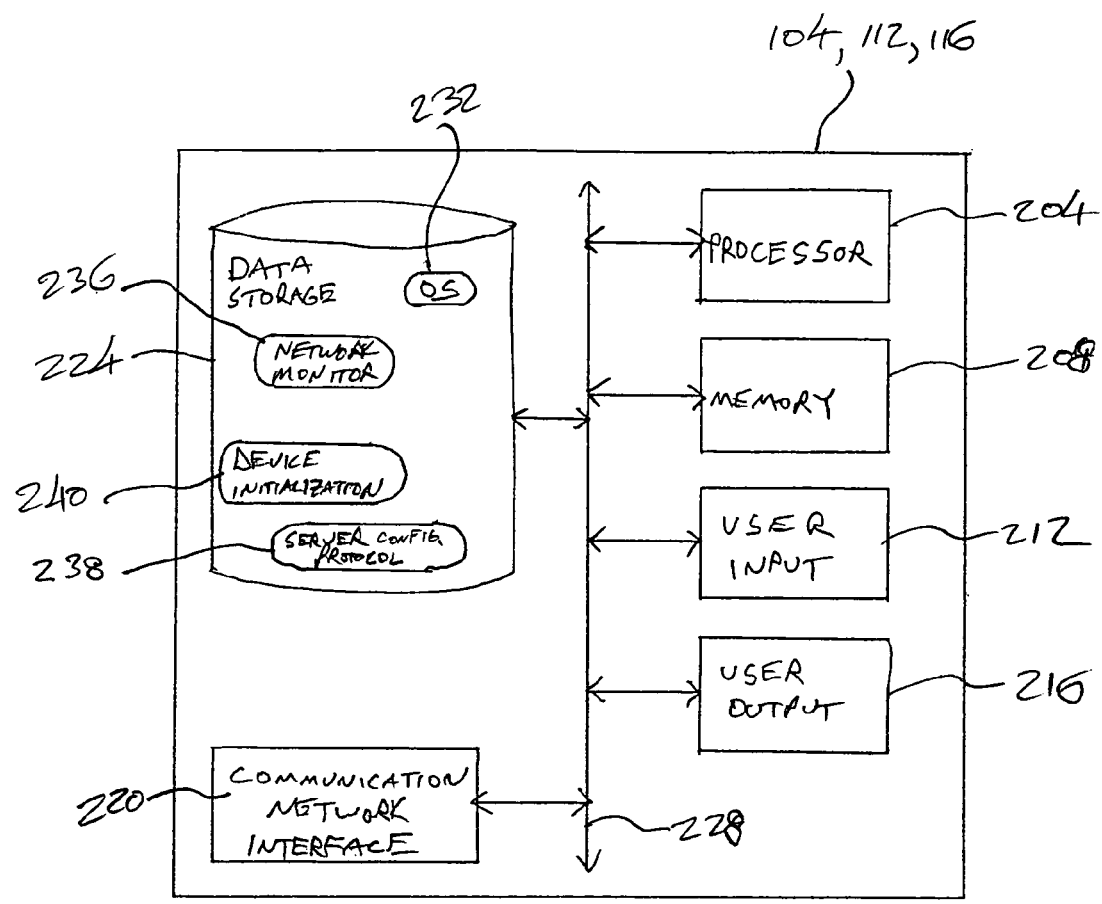
FIG. 2 is a block diagram depicting components of a server or device in accordance with embodiments of the present invention.

With reference now to FIG. 2, components that may be included as part of a network server 104, a device 112, or a network monitor device 116 are illustrated. In general, a network server 104, device 112, or network monitor device 116 may include a processor 204, memory 208, an input device 212, an output device 216, a communication network interface 220, and data storage 224. A communication bus 228 may also be provided to enable communications between the various components.

The processor 204 may include any general purpose programmable processor or controller 204 for executing application or operating system programming or instructions. Alternatively, the processor 204 may comprise a specially configured application specific integrated circuit (ASIC). The processor 204 generally functions to run programming code implementing various of the functions performed by the server 104, or the device 112 or 116, as described in greater detail elsewhere herein. The memory 208 may be provided for use in connection with the execution of the programming, and for the temporary or long-term storage of data or program instructions. The memory 208 may comprise solid state memory, such as DRAM or SDRAM. Where the processor 204 comprises a controller, the memory 208 may be integral to the processor 204.

One or more input devices 212 and one or more output devices 216 may also be included. As can be appreciated by one of skill in the art, examples of input devices 212 that may be provided include a numeric keypad, a keyboard, a microphone, and a pointing device. Examples of output devices 216 that may be provided include a visual display and a speaker. As can be appreciated by one of skill in the art from the description provided herein, the examples of input 212 and output 216 devices are not exclusive to a network server 104, to a device 112, or to a network monitor device 116. Instead, the provision of such devices 212, 216 depends on the particular application and/or implementation of a network server 104, device 112, or network monitor device 116.

A communication network interface 220 interconnects the network server 104, device 112, or network monitor device 116 to the communication network 108. Accordingly, the communication network interface 220 is generally determined by the particular type of communication network 108 to which the server or device 104 or device 112 or 116 is interconnected. For example, the communication network interface 220 may comprise an Ethernet interface.

The data storage 224 may store programming or data. For example, the data storage 224 may store operating system instructions 232. Furthermore, a network server 104 implementing the network monitor function described herein, or a network monitor device 116, may store a network monitor application 236. In addition, a server configuration protocol application 238 may be associated with a server 104 for assigning and providing configuration information to devices 112. In connection with a device 112, a device initialization application 240 may be provided for obtaining and using configuration information from the server 104, and for responding to congestion alert messages. In addition, any additional application programming or data may be stored in data storage 224 as required by the particular implementation of the server 104, device 112 or network monitor device 116. The data storage 224 may include magnetic storage devices, solid state storage devices, optical storage devices, logic circuits, or any combination of such devices. It should further be appreciated that the programs or data that may be maintained in the data storage 224 can comprise software, firmware or hardwired logic, depending on the characteristics of the data storage 224.

Figure 3:
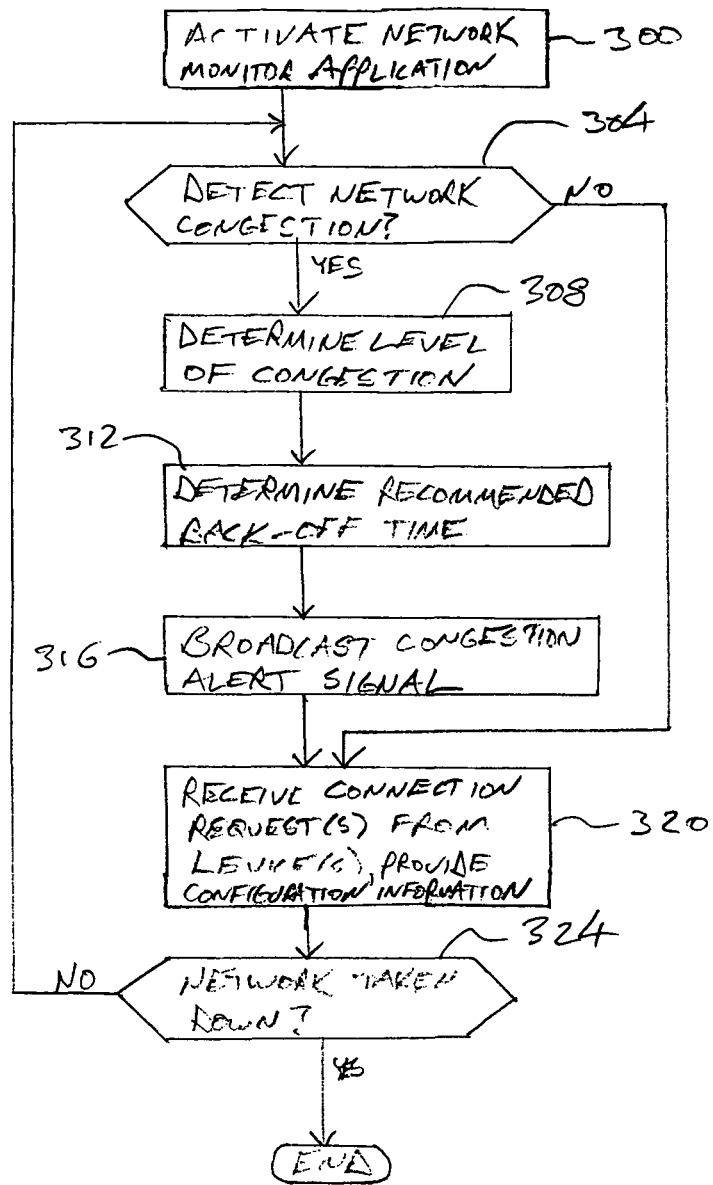
FIG. 3 is a flowchart depicting aspects of the operation of a system incorporating a network monitor application in accordance with embodiments of the present invention.

With reference now to FIG. 3, aspects of the operation of a network associated with a network monitor application 236 in accordance with embodiments of the present invention are illustrated. Initially, at step 300, the network monitor application 236 is activated. A determination is then made as to whether network congestion is detected (step 304). Alternatively or in addition, the network monitor application 236 may determine whether the communication network 108 is likely to become congested, for example when the network monitor application 236 detects or is informed that a large number of devices 112 have become disconnected due to a power outage or other fault condition. If it is determined that the communication network 108 is congested, the level of congestion may be determined (step 308). At step 312, a recommended back-off time is determined. The recommended back-off time may be based on any determination regarding the level of congestion. The congestion alert message or signal is then broadcast on a well-known port to all devices 112 on the communication network 108 (step 316). In accordance with embodiments of the present invention, the congestion alert message may include an indication as to the determined level of congestion, and/or a recommended back-off time. In addition, the congestion alert message may provide different recommended back-off times for different types or classes of devices 112.

After broadcasting a congestion alert message, or after determining that the network is not congested, a connection request or requests are received at the network server 104, and configuration information is provided in reply (step 320), for example by operation of the server configuration protocol application 238. At step 324, a determination is made as to whether the network has been taken down. If the network remains operational, the process returns to step 304. Accordingly, it can be appreciated that the network monitor application 236 may continuously or periodically check for network congestion, as long as the communication network 108 remains operational. If the network is taken down, the process ends.

Figure 4:
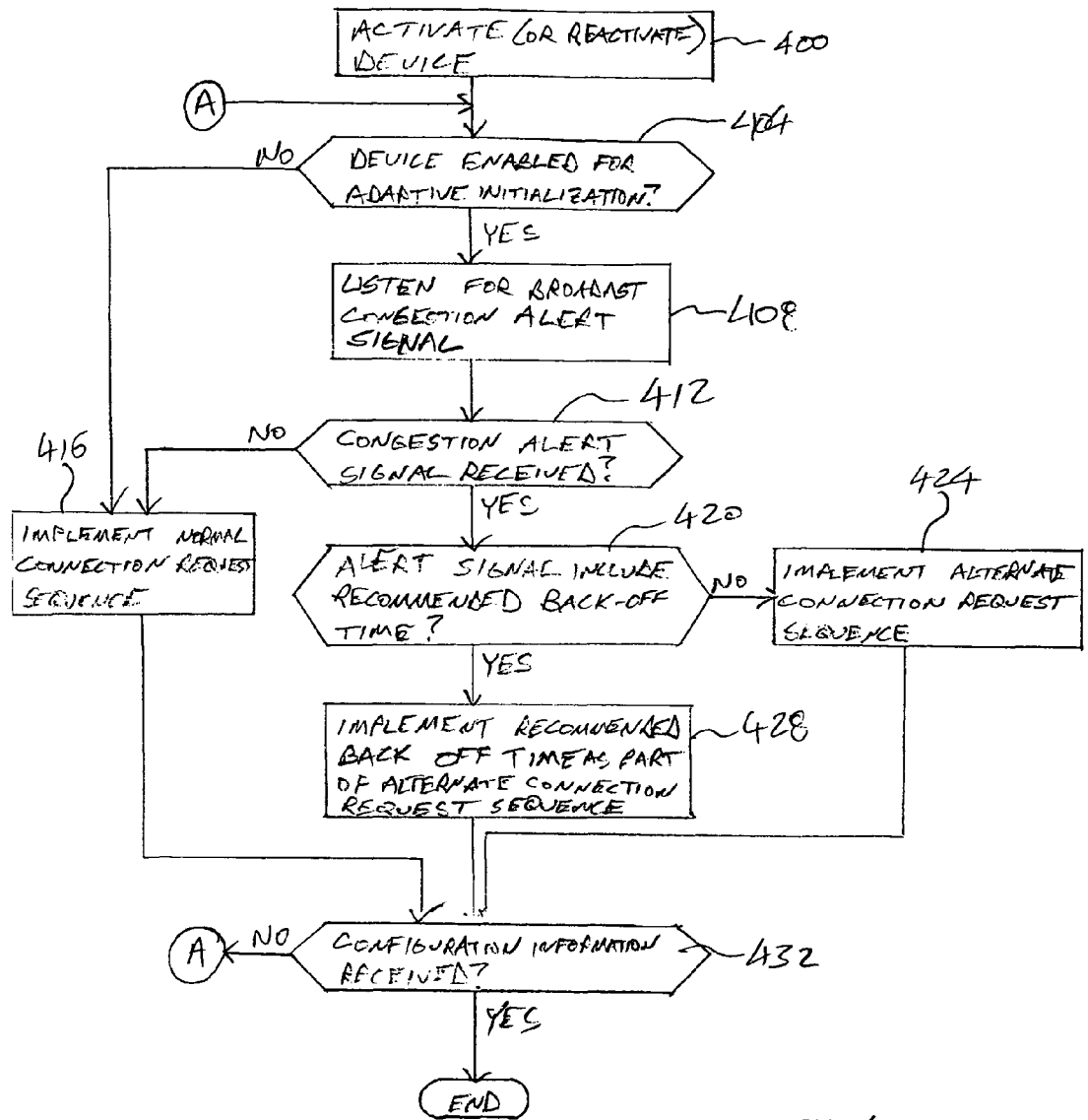
FIG. 4 is a flowchart depicting aspects of the operation of a device in accordance with embodiments of the present invention.

With reference now to FIG. 4, aspects of the operation of a device 112 in accordance with embodiments of the present invention are illustrated. Initially, at step 400, the device 112 is activated or reactivated. In general, activation may occur when a device 112 is powered up, either initially or upon the restoration of power following a power outage. Furthermore, reactivation of a device 112 may occur when a device is rebooted or reinitialized, without necessarily interrupting power to the device 112. For example, a device 112 that does not receive a lease extension from the server 104 that initially provided it with configuration information may be required to reinitialize and to broadcast a request for configuration information.

At step 404, a determination is made as to whether the device 112 is enabled for adaptive initialization. In particular, a determination is made as to whether a device initialization application 240 in accordance with embodiments of the present invention is associated with or running on the device 212. If the device is enabled for adaptive initialization, following activation or reactivation, the device 112 listens for a broadcast congestion alert signal or message (step 408). In accordance with embodiments of the present invention, the device 112 listens for a broadcast congestion alert message or signal for a predetermined period of time. Such a predetermined period of time may correspond to the interval at which repeated congestion alert signals are broadcast by the network monitor application 236 running on the network server 104 or on a network monitor device 116. A determination is then made as to whether a congestion alert message or signal has been received or detected by the device 112 (step 412).

If no congestion alert signal is received at step 412, or if the device is not enabled for adaptive initialization, a normal connection request sequence is implemented (step 416). That is, the device 112 may request configuration information from the network server 104 without any added period of delay interposed.

If a congestion alert signal is received at step 412, a determination is made as to whether the received alert message or signal includes a recommended back-off time (step 420). If no recommended back-off time is included in the congestion alert message, an alternate connection request sequence is implemented (step 424). The alternate connection request sequence may interpose a predetermined period of delay between startup of the device 112 and sending a request for configuration information to the network server 104. Alternatively, the alternate connection request sequence may delay for a random period before sending a request for configuration information. The period of random delay may be within predetermined bounds.

If the alert signal or message is determined to include a recommended back-off time at step 420, that recommended back-off time is implemented as part of the alternate connection request sequence (step 428). The recommended back-off time may comprise a set or recommended period of delay between activation or reactivation of the device 112, or from receipt of the congestion message, before a request for configuration information or a connection request message is sent from the device 112 to the network server 104. Furthermore, the period of delay may be altered by a random amount applied by an individual device 112 in response to a congestion alert message containing the recommended back-off time.

After a request for configuration information is sent as part of implementing a connection request sequence at step 416, 424 or 428, a determination is made as to whether configuration information is received (step 432). If configuration information is received, the device configuration process ends. If configuration information is not received, (for example within a predetermined timeout period), the process returns to step 404. As can be appreciated by one of skill in the art, a device 112 making a second or subsequent request for configuration information as part of a normal connection request sequence 416 may follow the normal connection protocol. Furthermore, it can be appreciated that an alternative connection request sequence performed at steps 424 or 428 may, on second or subsequent attempts interpose a period of delay between the previous attempt and a later attempt according to a predetermined schedule or scheme. Furthermore, where a device 112 receives a broadcast message that recommends a period of delay, the period of delay recommended as part of a subsequent congestion alert message can be applied.

It should be appreciated that all of the devices 112 interconnected to a communication network 108 as part of a system 100 need not include a device initialization application 240 in accordance with embodiments of the present invention. However, even if a number of the devices 112 do not implement or run a device initialization application 240, improved boot-times as compared to conventional systems can be realized. Furthermore, of those devices 112 that are associated with a device initialization application, some may recognize and implement recommended periods of delay, if such information is provided as part of a congestion alert message. In a further aspect, embodiments of the present invention may provide different recommended periods of delay to different device types or classes. For instance, in a system 100 implementing a telephony communication system, devices 112 comprising communication endpoints may be assigned to a shorter period of delay, or no delay, while devices 112 comprising printers may be assigned a longer period of delay before sending a connection request.

Although certain examples of communication systems 100 in accordance with the present invention comprising telephony networks have been provided, it should be appreciated that the present invention is not so limited. In particular, the present invention may have application in connection with any system comprising a communication network 108 in which a large number of devices 112 may attempt to obtain configuration information simultaneously or substantially simultaneously.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments with various modifications required by their particular application or use of the invention. It is intended that the appended claims be construed to include the alternative embodiments to the extent permitted by the prior art.

What is claimed is:

1. A method for controlling devices booting-up on a network, comprising:
    monitoring by a network monitor application congestion on a first network, wherein a plurality of devices are interconnected to said first network;
    detecting that said first network is congested;
    in response to detecting that said first network is congested, broadcasting a congestion alert message from said network monitor application to said plurality of devices interconnected to said first network, wherein said congestion alert message is broadcast prior to an initial request for configuration information by a first device included in the plurality of devices interconnected to said first network; and
    booting the first device included in said plurality of devices interconnected to said first network, said booting including:
        prior to sending from said first device said initial request for configuration information, listening at a designated port of said first device for said congestion alert message; and
        in response to detecting said congestion alert message at said first device, applying a different connection request sequence than if no congestion alert message had been received, wherein said different connection request sequence includes delaying sending from said first device said initial request for configuration information.

2. The method of claim 1, wherein said congestion alert message is detected, wherein said congestion alert message includes a recommended back-off time, wherein said different connection request sequence includes waiting at least said recommended back-off time before sending said initial request for configuration information.

3. The method of claim 1, wherein said different connection request sequence includes sending said initial request for configuration information after a delay period has elapsed, and wherein said initial request for configuration information is an initial dynamic host configuration protocol request.

4. The method of claim 1, further comprising:
    determining a level of network congestion; and
    selecting a recommended back-off time based on said determined level of network congestion, wherein said congestion alert message includes said selected back-off time.

5. The method of claim 1, wherein said broadcasting a congestion alert message comprises periodically broadcasting said congestion alert message.

6. The method of claim 1, wherein said different connection request sequence includes a modified back-off time.

7. The method of claim 2, wherein said back-off time comprises a nominal time between successive connection requests by a device included in said plurality of devices.

8. The method of claim 1, wherein said congestion alert message includes a first recommended back-off time for a first class of device included in said plurality of devices and a second recommended back-off time for a second class of device included in said plurality of devices.

9. The method of claim 1, wherein detecting that said first network is congested includes detecting a power outage affecting a number of said plurality of devices.

10. The method of claim 1, wherein said initial request for configuration information is an initial bootstrap protocol request.

11. A system for facilitating the initialization of networked devices, comprising:
    a communication network;
    a network server interconnected to said communication network;
    a communication network monitor application operable to monitor said communication network and operable to broadcast a congestion alert message in response to detecting a congestion condition with respect to said communication network; and
    a plurality of devices interconnected to said communication network, wherein at least some of said plurality of devices are operable to implement a standard connection request sequence in the absence of receiving a congestion alert message broadcast by said communication network monitor application in response to detecting a congestion condition, wherein said at least some of said plurality of devices are operable to implement an alternate connection request sequence in response to receiving a congestion alert message broadcast by said communication network monitor application, wherein said alternate connection request sequence includes delaying sending an initial request for configuration information from said at least some of said plurality of devices, operable to implement an alternate connection request sequence in response to receiving a congestion alert message broadcast by said communication network monitor application, wherein said congestion alert message is broadcast prior to receiving a connection request from said at least some of said plurality of devices, and wherein said connection request is part of a boot sequence of said at least some of said plurality of devices.

12. The system of claim 11, further comprising:
    a communication network monitor device interconnected to said communication network, wherein said communication network monitor application is running on said communication network monitor device.

13. The system of claim 11, wherein said communication network monitor application is running on said network server.

14. The system of claim 11, wherein at least one of said devices operable to implement an alternate connection request sequence in response to receiving a congestion alert message is of a first class, wherein at least one of said devices operable to implement an alternate connection request sequence in response to receiving a congestion alert message is of a second class, and wherein said congestion alert message sent by said communication network monitor application includes a recommended initialization back-off time for said first class of device.

15. The system of claim 11, wherein said communication network comprises an Internet protocol network.

16. The system of claim 15, wherein at least some of said devices comprise Internet protocol telephony devices.

17. The system of claim 16, wherein said server comprises a telephony server.

18. The system of claim 11, wherein said detecting a congestion condition includes detecting a power outage affecting at least some of said plurality of devices interconnected to said communication network.

19. A computational component comprising a non-transitory computer readable storage medium having computer program instructions stored thereon, which when executed by one or more computer processors, cause the one or more computer processors to perform a method, the method comprising:

monitoring traffic on a communication network;

detecting congestion on said communication network; and in response to detecting congestion on said communication network, broadcasting a congestion alert message to devices interconnected to said communication network, wherein a server device on said communication network is operable to receive and respond to connection request messages from said devices as part of an initialization process of said devices, wherein in response to receiving said broadcast congestion alert message said devices modify said initialization process as compared to when no broadcast congestion alert message is received, wherein said modified initialization process includes delaying sending an initial request for configuration information from said devices to said server device, and wherein prior to receiving said broadcast congestion alert message said devices have not sent an initial request for configuration information.

20. The computational component of claim 19, wherein the method further comprises:

determining a level of said congestion, wherein said congestion alert message includes a recommended back-off time for said initialization process of said devices.

21. The computational component of claim 19, wherein the method further comprises:

detecting an interruption in communication network service, wherein said congestion alert message is broadcast in response to said detected interruption in communication network service.

22. The computational component of claim 21, wherein said interruption in communication network service comprises an interruption of a connection between each of a plurality of interconnected devices and said communication network.

23. The computational component of claim 21, wherein said interruption in communication network service comprises an interruption of power to a plurality of interconnected devices, wherein said plurality of interconnected devices must perform said initialization process.

24. The computational component of claim 19, wherein said computational component comprises a logic circuit.

25. A communication system, comprising:

a server;

a communication network interconnected to said server;

a plurality of devices interconnected to said communication network, wherein each of said plurality of devices at least one of receives data from and provides data to said server over an assigned connection made over said communication network;

a server configuration protocol application operable to service connection requests, wherein a connection is assigned to at least a first requesting device included in said plurality of devices in response to a connection request message from said at least a first requesting device;

a network monitor application operable to monitor congestion on said communication network, wherein a congestion message is generated and is broadcast to said plurality of devices by said network monitor application in response to determining that said communication network is congested, wherein said plurality of devices monitor said communication network for said congestion alert message, wherein following an interruption in communication network service said plurality of devices implement a standard connection request sequence in response to failing to detect said congestion alert message and implement an alternate connection request sequence in response to detecting said congestion alert message, wherein said alternate connection request sequence includes delaying an initial request for configuration information by said plurality of devices, and wherein following said interruption in communication network service but prior to receiving said congestion alert message said plurality of devices do not implement said alternate connection request sequence.

26. The system of claim 25, wherein said congestion alert message includes a recommended delay time, wherein said plurality of devices delay a next connection request message by said recommended delay time.

27. The system of claim 25, wherein said congestion alert message includes a recommended delay time, wherein said plurality of devices delay a next connection request message by a period of time based on said recommended delay time.

28. The system of claim 25, wherein said plurality of devices comprise devices included in at least first and second device classes, wherein said congestion alert message signals said first class to delay a next connection request message by about a first period of time.

29. The system of claim 28, wherein said congestion alert message signals said second class to delay a next connection request message by about a second period of time.

30. The system of claim 25, wherein said initial request for configuration information includes one of an initial dynamic host configuration protocol request or an initial bootstrap protocol request.

* * * * *